US011100321B2

(12) United States Patent
Nakata et al.

(10) Patent No.: US 11,100,321 B2
(45) Date of Patent: Aug. 24, 2021

(54) INFORMATION PROCESSING METHOD AND INFORMATION PROCESSING SYSTEM

(71) Applicant: Panasonic Intellectual Property Corporation of America, Torrance, CA (US)

(72) Inventors: Yohei Nakata, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 124 days.

(21) Appl. No.: 16/257,160

(22) Filed: Jan. 25, 2019

(65) Prior Publication Data

US 2019/0236354 A1 Aug. 1, 2019

Related U.S. Application Data

(60) Provisional application No. 62/623,139, filed on Jan. 29, 2018.

(30) Foreign Application Priority Data

Sep. 21, 2018 (JP) .............................. JP2018-177762

(51) Int. Cl.
*G06K 9/00* (2006.01)
*G06N 5/04* (2006.01)
(Continued)

(52) U.S. Cl.
CPC ............ *G06K 9/00536* (2013.01); *G06N 3/08* (2013.01); *G06N 3/082* (2013.01); *G06N 5/04* (2013.01); *G06N 20/00* (2019.01)

(58) Field of Classification Search
CPC .......... G06N 3/08; G06N 3/082; G06N 20/00; G06N 5/04; G06N 3/04; G06N 5/0454;
(Continued)

(56) References Cited

U.S. PATENT DOCUMENTS 10,657,259 B2 * 5/2020 Lee ....................... G06N 5/041
2004/0059695 A1 * 3/2004 Xiao ...................... G06N 3/082
706/25

(Continued)

FOREIGN PATENT DOCUMENTS

WO 2017/149722 9/2017

OTHER PUBLICATIONS

Extended European Search Report dated Jun. 25, 2019 in corresponding European Patent Application No. 19152927.0.

*Primary Examiner* — Michael J Vanchy, Jr.
(74) *Attorney, Agent, or Firm* — Wenderoth, Lind & Ponack, L.L.P.

(57) ABSTRACT

An information processing method including the following executed using a computer: obtaining a neural network model that solves a regression problem; obtaining input data and label data corresponding to the input data; compressing a network of the neural network model to obtain a compressed model; and changing the label data and the number of nodes in the neural network model, based on information indicating performance of the compressed model, the number of nodes being assigned to the regression problem, the information being calculated using the label data and output data which is obtained by inputting the input data to the compressed model.

8 Claims, 3 Drawing Sheets

(51) Int. Cl.
*G06N 3/08* (2006.01)
*G06N 20/00* (2019.01)

(58) Field of Classification Search
CPC ... G06N 3/084; G06K 9/00536; G06K 9/4628
See application file for complete search history.

(56) References Cited

U.S. PATENT DOCUMENTS

| | | | |
|---|---|---|---|
| 2016/0335536 A1* | 11/2016 | Yamazaki | G06N 3/04 |
| 2017/0220929 A1* | 8/2017 | Rozen | G06N 3/063 |
| 2018/0174260 A1* | 6/2018 | Cui | G06N 20/10 |
| 2018/0268292 A1* | 9/2018 | Choi | G06K 9/6217 |
| 2018/0276560 A1* | 9/2018 | Hu | G06N 20/00 |
| 2019/0095629 A1* | 3/2019 | Lee | G06F 21/602 |
| 2020/0064444 A1* | 2/2020 | Regani | G01S 7/415 |
| 2020/0090045 A1* | 3/2020 | Baker | G06N 3/084 |

* cited by examiner

INFORMATION PROCESSING METHOD AND INFORMATION PROCESSING SYSTEM

CROSS REFERENCE TO RELATED APPLICATION

This application claims the benefit of priority of U.S. Provisional Patent Application No. 62/623,139 filed on Jan. 29, 2018, claiming the benefit of priority of Japanese Patent Application Number 2018-177762 filed on Sep. 21, 2018, the entire contents of which are hereby incorporated by reference.

BACKGROUND

1. Technical Field

The present disclosure relates to an information processing method and an information processing system.

2. Description of the Related Art

In recent years, research and development has been conducted on deep learning-based neural networks. A deep learning-based neural network, however, requires a large amount of computational resources and a very long computation time because the amount of computation in training is massive. A reduced amount of computation is therefore demanded.

PCT International Publication No. WO 2017/149722 (Patent Literature 1), for example, discloses a computing method in which scalar quantization is performed in a certain layer in a multilayered neural network, and in the next layer, scalar quantized vectors are multiplied with a weighting matrix. Patent Literature 1 thereby assumes that it is possible, with this computing method, to reduce the amount of computation in a multilayered neural network.

SUMMARY

With the conventional technique disclosed in Patent Literature 1, however, the performance of a model might be degraded due to the compression of the model. With a neural network model that solves a regression problem, for example, an output resolution of the model becomes less accurate due to the compression of the model, and this might decrease the accuracy of the outputs of the model.

In view of the above, the present disclosure has an object to provide an information processing method and an information processing system with which it is possible to inhibit the performance degradation of a model due to compression.

In order to achieve the above-described object, an information processing method according to one embodiment of the present disclosure includes the following executed using a computer: obtaining a neural network model that solves a regression problem; obtaining input data and label data (correct answer data) corresponding to the input data; compressing a network of the neural network model to obtain a compressed model; and changing the label data and the number of nodes in the neural network model, based on information indicating performance of the compressed model, the number of nodes being assigned to the regression problem, the information being calculated using the label data and output data which is obtained by inputting the input data to the compressed model.

Note that these comprehensive or concrete embodiments may be realized by a system, a method, an integrated circuit, a computer program, or a computer-readable recording medium such as a CD-ROM, or by any combination thereof.

With the information processing method, etc. according to the present disclosure, it is possible to inhibit the performance degradation of a model due to compression.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
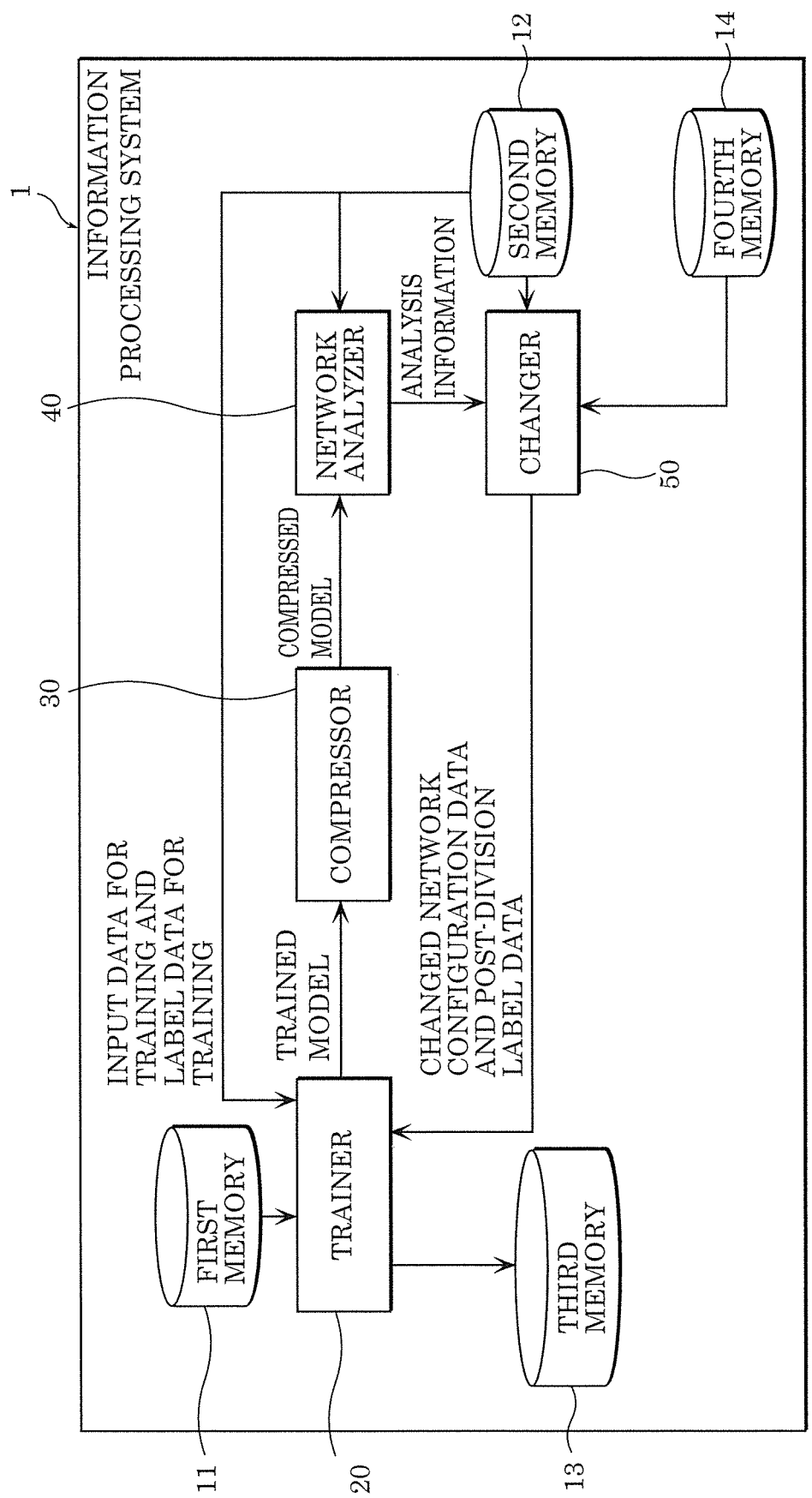
FIG. 1 is a block diagram illustrating an information processing system according to an embodiment.

An information processing method according to one embodiment of the present disclosure includes the following executed using a computer: obtaining a neural network model that solves a regression problem; obtaining input data and label data corresponding to the input data; compressing a network of the neural network model to obtain a compressed model; and changing the label data and the number of nodes in the neural network model, based on information indicating performance of the compressed model, the number of nodes being assigned to the regression problem, the information being calculated using the label data and output data which is obtained by inputting the input data to the compressed model.

With this method, by changing the number of nodes in a model, it is possible to reduce the influence due to compression, that is, resolution degradation. By increasing the number of nodes assigned to a regression problem, for example, it is possible to enhance the output resolution of the model. Accordingly, it is possible to inhibit the performance degradation of the model due to the compression of the model.

An information processing system according to one embodiment of the present disclosure includes: a first obtainer that obtains a neural network model that solves a regression problem; a second obtainer that obtains input data and label data corresponding to the input data; a compressor that compresses a network of the neural network model to obtain a compressed model; and a changer that changes the label data and the number of nodes in the neural network model, based on information indicating performance of the compressed model, the number of nodes being assigned to the regression problem, the information being calculated using the label data and output data which is obtained by inputting the input data to the compressed model.

An information processing method according to one aspect of the present disclosure includes the following executed using a computer: obtaining a neural network model for object detection which solves a regression problem; obtaining input image data and label data corresponding to the input image data; compressing a network of the neural network model to obtain a compressed model; and changing the label data and the number of nodes in the neural network model, based on information indicating performance of the compressed model, the number of nodes being assigned to the regression problem, the information being calculated using the label data and output data which is obtained by inputting the input image data to the compressed model.

With the information processing system and information processing method as described above, the same advantageous effects as described above are produced.

In the information processing method according to one embodiment of the present disclosure, the changing of the number of nodes includes changing the number of nodes such that a condition for the performance required for the compressed model is satisfied.

With this, it is possible to control whether the number of nodes should be changed based on the performance of a model.

The information processing method according to one embodiment of the present disclosure further includes determining whether the information indicating the performance satisfies the condition for the performance. The changing of the number of nodes includes adding a node when the information indicating the performance does not satisfy the condition for the performance.

With this, by increasing the number of nodes assigned to a regression problem, it is possible to enhance the output resolution of a model that solves the regression problem.

In the information processing method according to one embodiment of the present disclosure, the changing of the number of nodes includes changing the number of nodes within a range in which the compressed model satisfies a condition for computational constraint.

With this, it is possible to generate a post-division model which satisfies the hardware requirements of a computer by which a compressed model is used. For example, the number of nodes in the compressed model is increased as long as conditions for computational constraints such as a processing speed, the amount of computation, and a memory size are satisfied.

In the information processing method according to one embodiment of the present disclosure, the information indicating the performance includes information based on a difference between the output data and the label data.

With this, it is possible to control whether the number of nodes should be changed, based on a performance index regarding the accuracy of an output of a model.

In the information processing method according to one embodiment of the present disclosure, the compressing includes changing a weight for the neural network model in accordance with a change in computation precision from floating-point to fixed-point representation.

With this, it is possible to generate a model that can be implemented even by hardware, such as an embedded system, which provides difficult hardware environment for carrying out floating-point processing.

In the information processing method according to one embodiment of the present disclosure, the increasing of the number of nodes in the output layer includes changing a distribution of the nodes.

With this, since nodes in an output layer have more influence on the outputs of a model than nodes any other layer, in a neural network, it is possible to effectively change the network configuration for the performance of models.

In the information processing method according to one embodiment of the present disclosure, the increasing of the number of nodes in the output layer includes changing a distribution of the nodes.

With this, it is possible to increase the number of nodes in an output layer without changing the number of nodes in a model. This can inhibit an increase in the amount of computational resources.

In the information processing method according to one embodiment of the present disclosure, the changing of the label data includes changing the label data in accordance with a division mode of the regression problem, the division mode being decided based on the information indicating the performance.

With this, it is possible to generate label data suitable for a model having nodes of which the number has been changed. Accordingly, it is possible to appropriately train such a model having the nodes of which the number has been changed.

The following describes in detail the embodiment for implementing the present invention with reference to the drawings. Note that the embodiments described below each show an illustrative embodiment of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements.

Note that the drawings are presented schematically and are not necessarily precise illustrations. In addition, like reference signs indicate like elements in the drawings, and overlapping descriptions thereof are omitted or simplified.

The following describes the information processing method and information processing system according to an embodiment of the present disclosure.

Embodiment (Configuration)

FIG. 1 is a block diagram illustrating information processing system 1 according to an embodiment.

As illustrated in FIG. 1, information processing system 1 is a system for generating a model. A model is, for example, an object detection model for detecting an object that appears in an image. The object detection model carries out inference (also referred to as labeling) of a class of a target object for which detection is carried out or inference of the size or location of the target object. The class of a target object is a type of the target object or the like, e.g., dog, horse, person, etc.

Information processing system 1 includes trainer 20, compressor 30, network analyzer 40, changer 50, first memory 11, second memory 12, third memory 13, and fourth memory 14.

Trainer 20 obtains network configuration data from first memory 11 and performs training of a neural network model having a network configuration indicated by the network configuration data, input data for training and label data for training which are obtained from second memory 12. Specifically, trainer 20 obtains, from second memory 12, input data for training (i.e. training data) and label data for training, and updates the parameters of the model, that is, weights of nodes, using a difference between label data for training and output data obtained by inputting the input data for training to the model. When the update of the parameters is completed, trainer 20 outputs the model that has been trained (hereinafter also referred to as "trained model"). Parameters of a trained model are, for example, weight vectors and bias values used in a neural network, and scaling values for batch normalization. Trainer 20 is one example of the first obtainer.

Additionally, trainer 20 performs retraining of the model using, the input data for training obtained from second memory unit 12, and network configuration data that has been changed and post-division label data for training that has been transformed which are obtained from changer 50 which will be mentioned later on. Trainer 20 stores, in third memory 13, the trained model obtained through the retraining.

Compressor 30 obtains the trained model from trainer 20 and compresses the trained model. The compression is quantization of the parameters of the trained model. The quantization of the parameters is, for example, converting parameters from floating-point to fixed-point representation in order to reduce the amount of data. Compressor 30 outputs the model that has been compressed (hereinafter referred to as "compressed model").

Network analyzer 40 obtains the compressed model from compressor 30, also obtains input data for evaluation and label data for evaluation, and analyzes the performance of the compressed model. Specifically, network analyzer 40 calculates a difference value between label data for evaluation and output data obtained by inputting the input data for evaluation to the compressed model, and analyzes the performance of the compressed model based on this difference value. Network analyzer 40 outputs analysis information which is an analysis result indicating the performance of the compressed model. Here, a difference value is one example of information indicating the difference between the label data for evaluation and the output data. The size of a difference value signifies the performance of a compressed model. In other words, the smaller a difference value is, the better the performance of a compressed model is. It should be noted that the performance of a compressed model includes the accuracy of a compressed model. It should be noted that the performance may be, for example, precision, recall, mean average precision (mAP), and area under the curve (AUC). In the case where a model is an object detection model in which an image is input, input data is image information and output data is a result of object detection. Network analyzer 40 is one example of the second obtainer.

Changer 50 obtains analysis information from network analyzer 40 and changes, based on the analysis information, the number of nodes, in a model, which is assigned to a regression problem. To change the number of nodes in a model is to increase or decrease the number of nodes assigned to a regression problem. Specifically, changer 50 changes the number of nodes in an output layer. Changing the number of nodes in an output layer includes, for example, changing a distribution of nodes within a network and adding nodes to a network.

Changer 50 determines whether the number of nodes in the model should be changed, based on the analysis information. Changer 50, for example, determines whether the performance of the compressed model satisfies a predetermined performance condition. For example, whether the accuracy of the output data of a compressed model is lower than a threshold is determined. When the accuracy is lower than the threshold, the performance of the compressed model does not satisfy the predetermined condition.

When determining that the predetermined performance condition is satisfied, changer 50 decides a division mode of the regression problem, and changes the number of nodes in accordance with the division mode of the regression problem.

Figure 2:
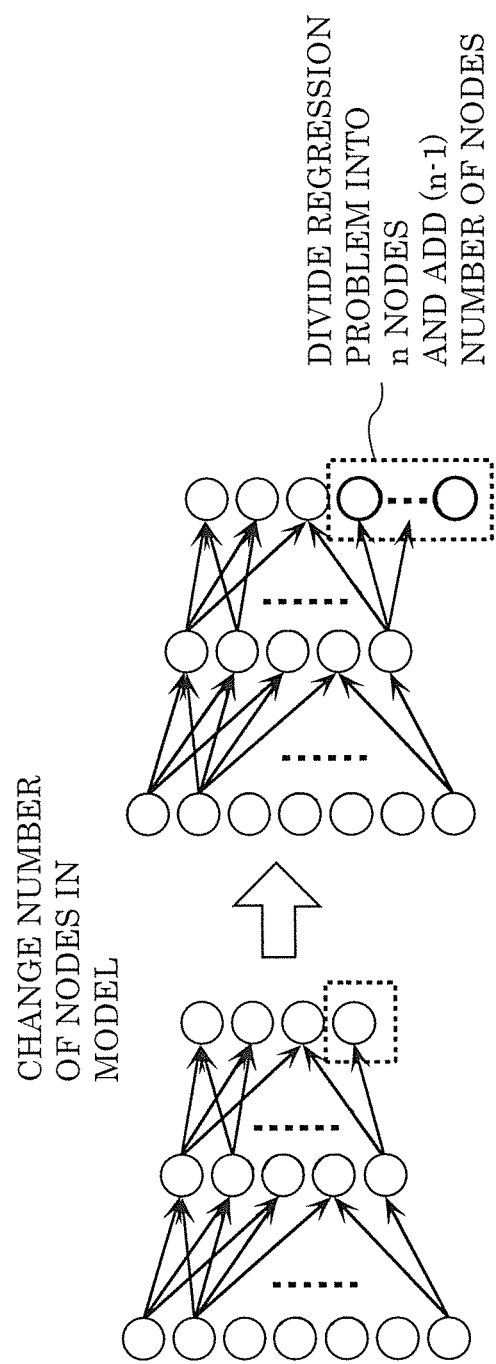
FIG. 2 is a schematic diagram illustrating a change of network made by the information processing system according to the embodiment.

An example of the change made by changer 50 will be described with reference to FIG. 2. FIG. 2 is a schematic diagram illustrating a change of network made by information processing system 1 according to this embodiment. When determining that the accuracy of the output data of the compressed model is lower than the threshold, changer 50 decides the number by which the regression problem is divided, so that the accuracy is enhanced. Changer 50 decides the number of nodes to be added, in accordance with the number decided for the division of the regression problem. For example, when deciding the number of division for the regression problem as n, changer 50 adds n−1 number of nodes to each of the nodes in the output layer.

When accuracy (representation) of 4 bits is defined for each of the nodes in the output layer and output data with accuracy (representation) of 8 bits is required, changer 50 adds one node to each of the nodes in the output layer. The upper 4 bits among 8 bits correspond to the existing nodes while the lower 4 bits correspond to the nodes that have been added. Changer 50 then outputs, to trainer 20, the network configuration data of the model for which the number of nodes has been changed.

It should be noted that changer 50 changes the number of nodes based on constraints. As illustrated in FIG. 1, changer 50 obtains change-constrained data from fourth memory 14. The change-constrained data indicates conditions for computational constraints imposed on a compressed model in a computer in which the compressed model has been installed. The conditions for computational constraints are, for example, working conditions for hardware such as a processor or a memory, a processing speed, the amount of computation, and a memory size. Changer 50 changes the number of nodes in the model within a range in which the compressed model satisfies the conditions for computational constraints. Regarding a limitation for the number of nodes that can be changed, the lower limit is determined according to desired performance while the upper limit is determined according to the conditions for computational constraints.

In addition, changer 50 obtains label data from second memory 12 and generates post-division label data by changing the label data in accordance with the division mode of the regression problem. For example, when the number by which the regression problem is divided is decided to be n and n−1 number of nodes are added to each of the nodes in the output layer, changer 50 renders the representation of the label data after change n times more accurate than that before change. Changer 50 renders the representation of the label data n times more accurate than before by dividing the label data into n pieces of data. Changer 50 outputs the post-division label data to trainer 20.

For example, when the label data of floating-point 32-bit type is handled in the division mode of dividing the regression problem by k and the accuracy representation of each node or weight is defined to be 4 bits, changer 50 converts the label data of floating-point 32-bit type to the accuracy representation of k×4 bits and thus divides into k pieces of label data. First memory 11 stores the network configuration data of a neural network model that solves a regression problem. Note that network configuration data that has been changed may also be stored in first memory 11.

Second memory 12 stores input data and label data that are to be used for performance evaluation or training of a model.

It should be noted that input data includes input data for evaluation and input data for training, and label data includes label data for evaluation and label data for training.

Third memory 13 stores trained models including trained models obtained through retraining after problem transformation.

Fourth memory 14 stores transformation-constrained data.

(Operations)

Next, operations performed by information processing system 1 according to this embodiment will be described.

Figure 3:
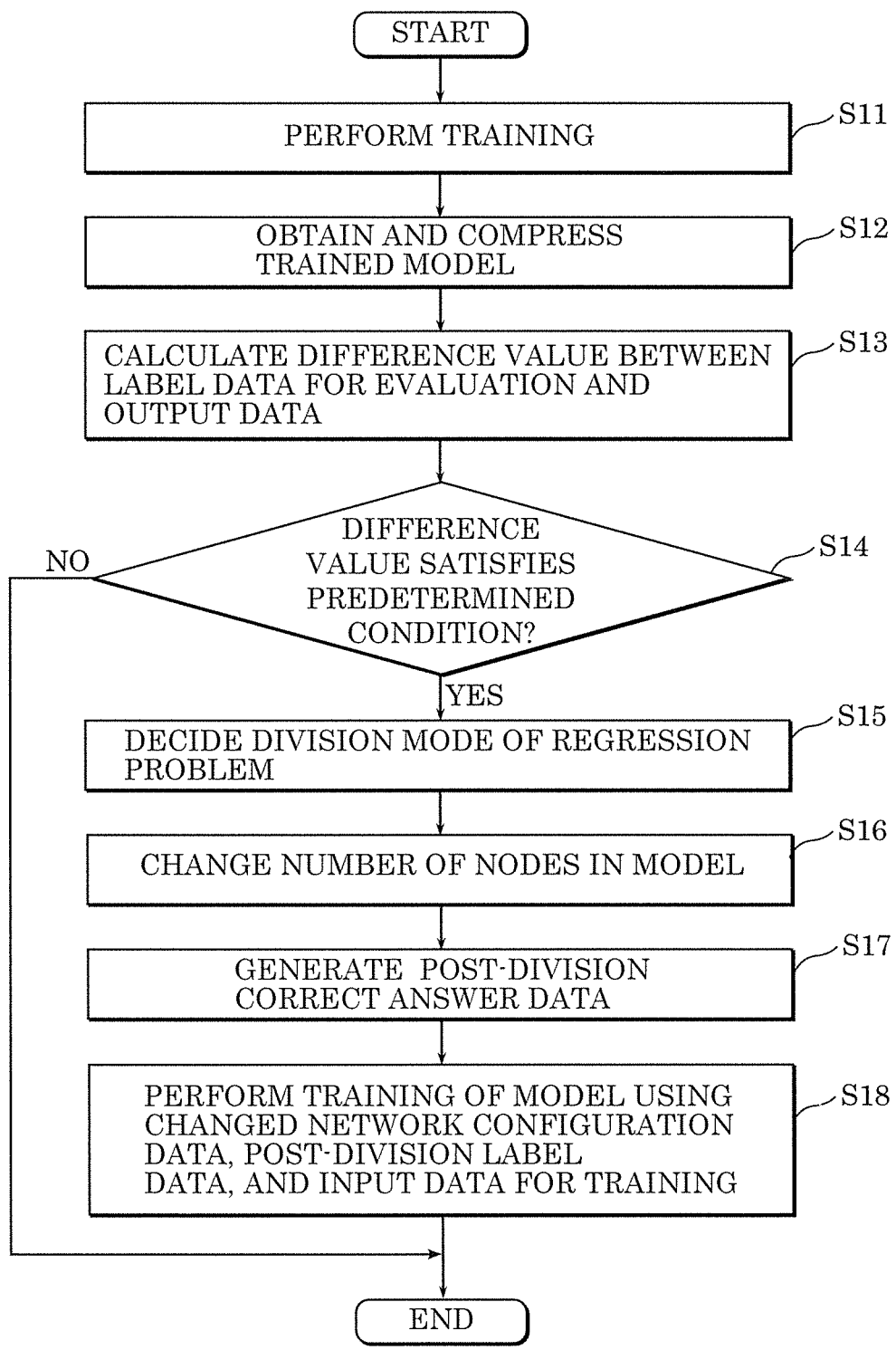
FIG. 3 is a flowchart illustrating operations performed by the information processing system according to the embodiment.

FIG. 3 is a flowchart illustrating the operations performed by information processing system 1 according to the embodiment.

As illustrated in FIG. 3, trainer 20 firstly performs training of a neural networking model having the network configuration indicated by the network configuration data obtained from first memory 11 (S11). Trainer 20 outputs a trained model to compressor 30.

Next, compressor 30 obtains the trained model from trainer 20 and compresses the trained model into a compressed model (S12). Compressor 30 then outputs the compressed model to network analyzer 40.

Next, network analyzer 40 obtains the compressed model from compressor 30, and also obtains input data for evaluation and label data for evaluation from second memory 12. Network analyzer 40 calculates a difference value between label data for evaluation and output data obtained by inputting the input data for evaluation to the compressed model (S13). Network analyzer 40 analyzes the performance of the compressed model based on the difference value. Network analyzer 40 outputs analysis information which is an analysis result indicating the performance of the compressed model.

The calculation of a difference value will be described using an example. Network analyzer 40 inputs image information (one example of input data) to the compressed model. With the use of the compressed model, a range (i.e., location and size) of a target object which appears in an image and for which detection is carried out is inferred by solving a regression problem. Network analyzer 40 then obtains a result of the inference (stated differently, a result of the object detection) carried out using the compressed model, that is, output data. Network analyzer 40 calculates a range of an image in which the target object is present, which results from the object detection carried out using the compressed model, and also calculates a difference value between the calculated range and a range indicated by the label data for evaluation. Then, network analyzer 40 outputs the calculated difference value to changer 50.

Next, changer 50 determines, in accordance with the analysis information, whether the number of nodes in the model should be changed, that is, whether the difference value satisfies a predetermined condition (S14). The determination on whether the difference value satisfies a predetermined condition is, for example, a determination on whether the accuracy of the output data of the compressed model is lower than a threshold.

Next, when the difference value satisfies the predetermined condition (YES in S14), changer 50 decides a division mode of the regression problem based on the analysis information obtained from network analyzer 40 (S15), and changes the number of nodes in the model in accordance with the division mode of the regression problem (S16). Specifically, when determining that the accuracy of the output data from the compressed model is lower than the threshold, changer 50 decides the number by which the regression problem is divided, so that the accuracy is enhanced. Changer 50 changes the number of nodes, in the output layer, which is to be assigned to one regression problem.

Here is an example illustrating a case where the number of nodes, of the model, which is assigned to a regression problem is not changed, that is, where one node is assigned to one regression problem. When a model is compressed into a model that solves a regression problem using four bits, the resolution of the compressed model is derived by $100/2^4=6.25$, and assuming that a true value as input data is 67, an inference value of the compressed model is 68.75. Note that using four bits is one example and the number of bits shall not be restricted to such. The number of bits depends on the functions of a device. However, in a case where the number of nodes assigned to one regression problem is increased to two and when a trained model is compressed into a model that solves a regression problem using four bits, the resolution of the compressed model is derived by $100/2^8=0.390625$ and an inference value of the compressed model is 67.1875, assuming that a true value as input data is 67. By thus increasing the number of nodes for solving one regression problem, it is possible to achieve the high gradation of output data. In the change of the number of nodes, changer 50 obtains change-constrained data from fourth memory 14 and changes the number of nodes assigned to one regression problem within a range in which conditions for computational constraints imposed on a compressed model in a computer in which the compressed model is installed are satisfied. In other words, changer 50 determines the number of nodes to be assigned to one regression problem, based on working conditions for hardware such as a processor or a memory, e.g., a processing speed, the amount of computation, and a memory size. Changer 50 then outputs, to trainer 20, the changed network configuration data of the model.

When the difference value does not satisfy the predetermined condition (NO in S14), the processing ends.

Next, changer 50 obtains the label data from second memory 12 and generates post-division label data by changing the label data in accordance with the division mode of the regression problem (S17). Changer 50 outputs the post-division label data to trainer 20.

Next, trainer 20 performs training of the model using the changed network configuration data of the model, the post-division label data, and input data for training obtained from second memory 12 (S18).

Trainer 20 stores, in third memory 13, trained models including trained models obtained through training after problem division.

(Advantageous Effects, etc.)

Thus, with information processing system 1, it is possible to reduce the influence due to compression, that is, resolution degradation, by changing label data and the number of nodes in a model. With information processing system 1, it is possible to enhance the output resolution of a model, for example, by increasing the number of nodes assigned to a regression problem. Accordingly, it is possible to inhibit the performance degradation of a model due to compression.

Other Embodiments

The information processing method and the information processing system according to one or more embodiments of the present disclosure have been described based on the exemplary embodiments. The present disclosure, however, is not limited to these exemplary embodiments.

Each of the processing units included in the information processing method, the information processing system according to each of the aforementioned Embodiments is typically realized, for example, as an LSI which is an integrated circuit. These circuits may be individually realized as one chip or may be realized as one chip including part or all of the circuits.

Each of the processing units to be realized as an integrated circuit is not limited to LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that in each of the aforementioned embodiments, each component may be configured by dedicated hardware or may be realized by executing a software program suitable for each component. Each component may be realized by causing a program executing unit such as a CPU or a processor to read a software program recorded on a recording medium such as a hard disk or a semiconductor memory and execute the software program.

All the numbers used above are exemplary numbers to specifically describe the present disclosure, and the present disclosure is not limited to the illustrated numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order to execute each step in the flowchart is an exemplary order for specifically describing the present disclosure, and may be other than the above-described order. Furthermore, part of the above-described steps may be executed at the same time as (in parallel to) the execution of other steps.

The information processing method and the information processing system according to one or multiple aspects of the present disclosure have been described based on the exemplary embodiments. The embodiments of the present disclosure, however, are not limited to the multiple aspects. Forms obtained by various modifications to each of the foregoing embodiments that can be conceived by a person skilled in the art as well as forms realized by combining components of different embodiments within the scope of the essence of the present disclosure are included in one or multiple aspects of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to an embedded device in which computational constraints are imposed.

What is claimed is:

1. An information processing method, comprising the following executed using a processor and a memory:

storing, in the memory, a neural network model that solves a regression problem, input data, and label data corresponding to the input data, obtaining, by the processor, the neural network model, the input data, and the label data from the memory;

compressing, by the processor, a network of the neural network model to obtain a compressed model;

determining, by the processor, a division mode of the regression problem based on information indicating performance of the compressed model, the information being calculated using the label data and output data which is obtained by inputting the input data to the compressed model; and changing, by the processor, (i) the number of nodes in an output layer of the compressed model and (ii) precision representation of the label data corresponding to the input data in accordance with the division mode of the regression problem, the number of nodes being assigned to the regression problem, wherein the compressed model of which the output layer has been changed is trained using the input data and the label data of which the precision representation has been changed, and the changing of the number of nodes includes increasing the number of nodes in the output layer without changing the number of nodes in layers of the compressed model which are located previous to the output layer.

2. The information processing method according to claim 1, wherein the changing of the number of nodes includes changing the number of nodes such that a condition for the performance required for the compressed model is satisfied.

3. The information processing method according to claim 2, further comprising:

determining, by the processor, whether the information indicating the performance satisfies the condition for the performance, wherein the changing of the number of nodes includes adding a node when the information indicating the performance does not satisfy the condition for the performance.

4. The information processing method according to claim 1, wherein the changing of the number of nodes includes changing the number of nodes within a range in which the compressed model satisfies a condition for computational constraint.

5. The information processing method according to claim 1, wherein the information indicating the performance includes information based on a difference between the output data and the label data.

6. The information processing method according to claim 1, wherein the compressing includes changing a weight for the neural network model in accordance with a change in computation precision from floating-point to fixed-point representation.

7. An information processing system, comprising:

a memory configured to store a program; and a processor configured to execute the program and control the information processing system to:

store, in the memory, a neural network model that solves a regression problem, input data, and label data corresponding to the input data, obtain the neural network model, the input data, and the label data from the memory;

compress a network of the neural network model to obtain a compressed model; and determine a division mode of the regression problem based on information indicating performance of the compressed model, the information being calculated using the label data and output data which is obtained by inputting the input data to the compressed model; and change (i) the number of nodes in an output layer of the compressed model and (ii) precision representation of the label data corresponding to the input data in accordance with the division mode of the regression problem, the number of nodes being assigned to the regression problem, wherein the compressed model of which the output layer has been changed is trained using the input data and the label data of which the precision representation has been changed, and the changing of the number of nodes includes increasing the number of nodes in the output layer without changing the number of nodes in layers of the compressed model which are located previous to the output layer.

8. An information processing method, comprising the following executed using a processor and a memory:

storing, in the memory, a neural network model for object detection which solves a regression problem, input image data, and label data corresponding to the input image data, obtaining, by the processor, the neural network model, the input image data, and the label data from the memory;

compressing, by the processor, a network of the neural network model to obtain a compressed model;

determining, by the processor, a division mode of the regression problem based on information indicating performance of the compressed model, the information being calculated using the label data and output data which is obtained by inputting the input image data to the compressed model; and changing, by the processor, (i) the number of nodes in an output layer of the compressed model and (ii) precision representation of the label data corresponding to the input image data in accordance with the division mode of the regression problem, the number of nodes being assigned to the regression problem, wherein the compressed model of which the output layer has been changed is trained using the input image data and the label data of which the precision representation has been changed, and the changing of the number of nodes includes increasing the number of nodes in the output layer without changing the number of nodes in layers of the compressed model which are located previous to the output layer.

* * * * *